Oct. 10, 1961 O. A. ITRIA 3,003,577
APPARATUS FOR SEISMIC EXPLORATION
Filed June 5, 1957 3 Sheets-Sheet 1
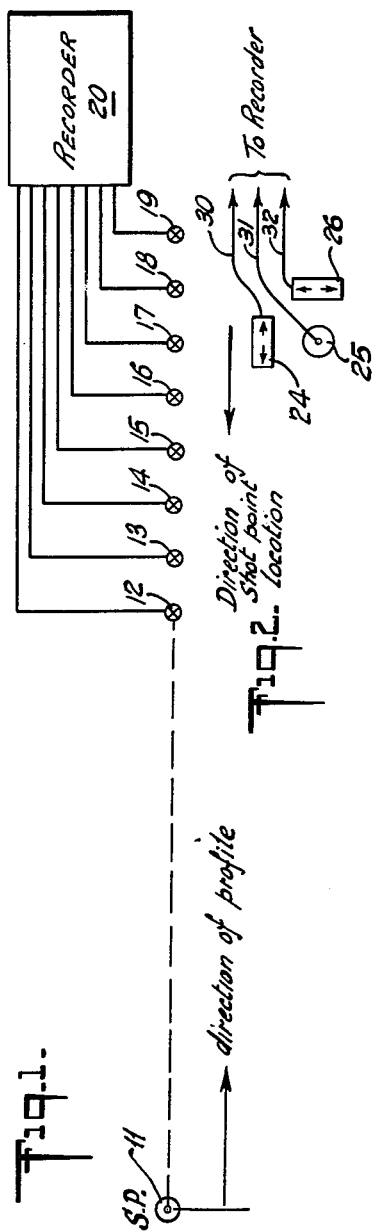
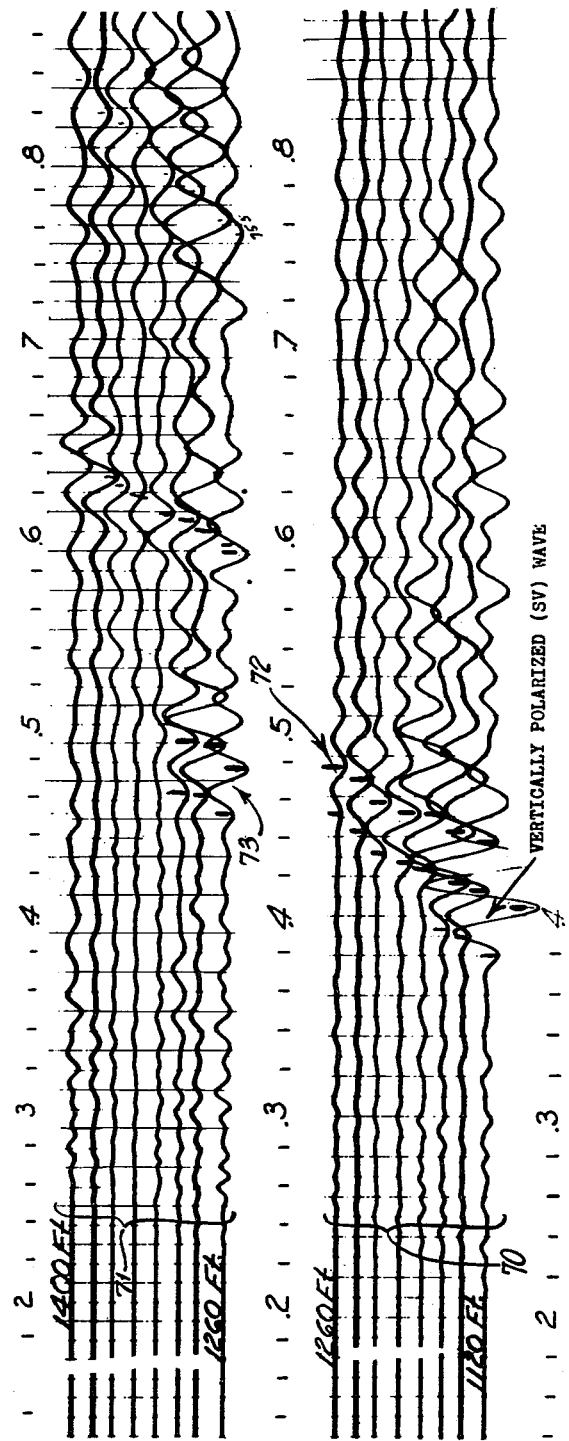

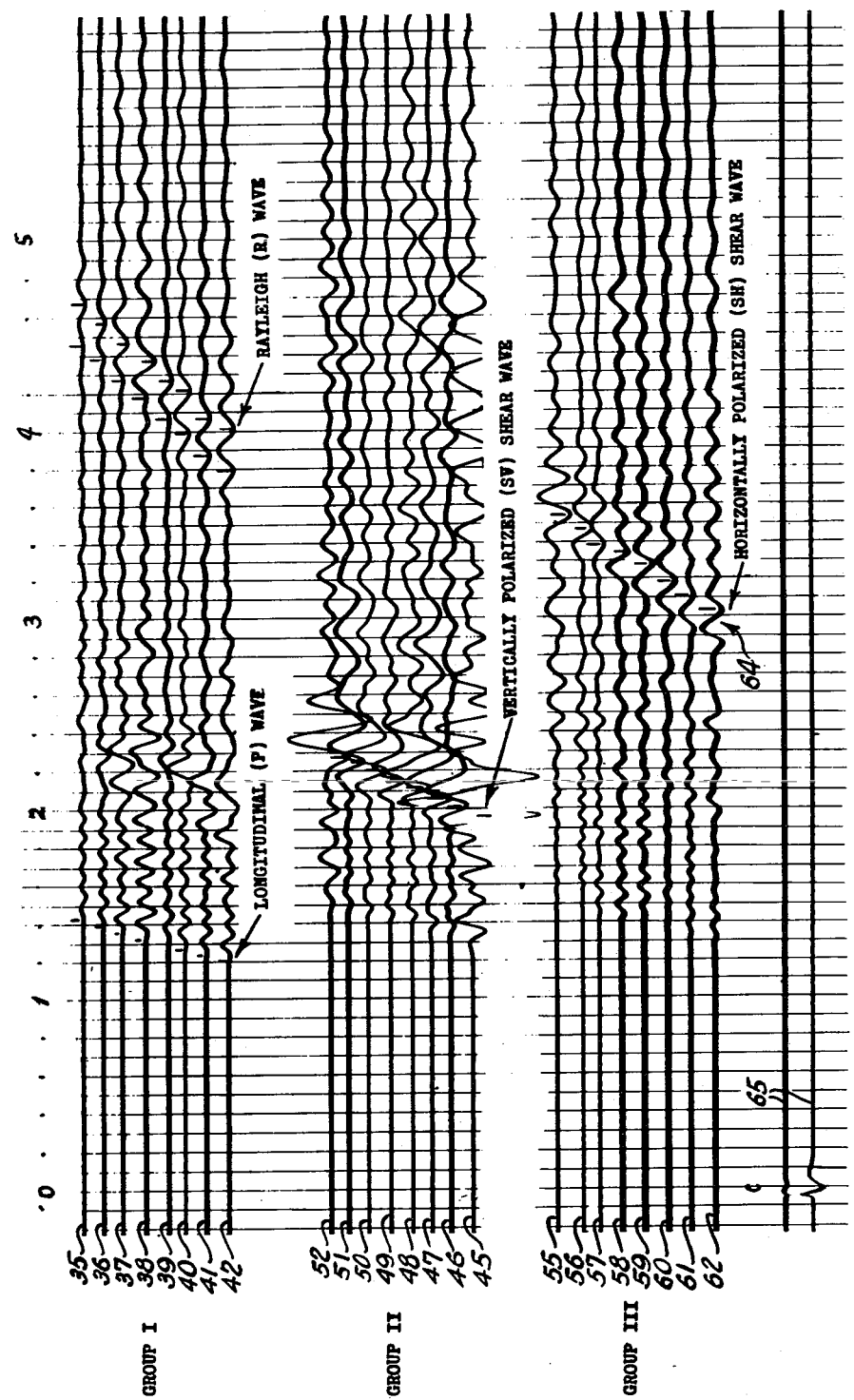

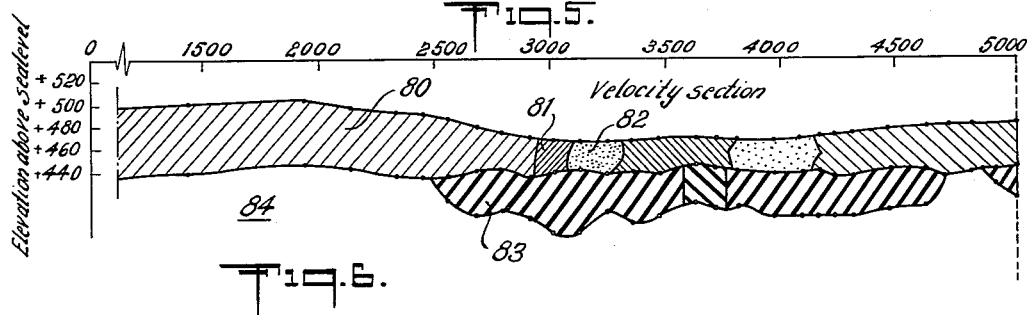
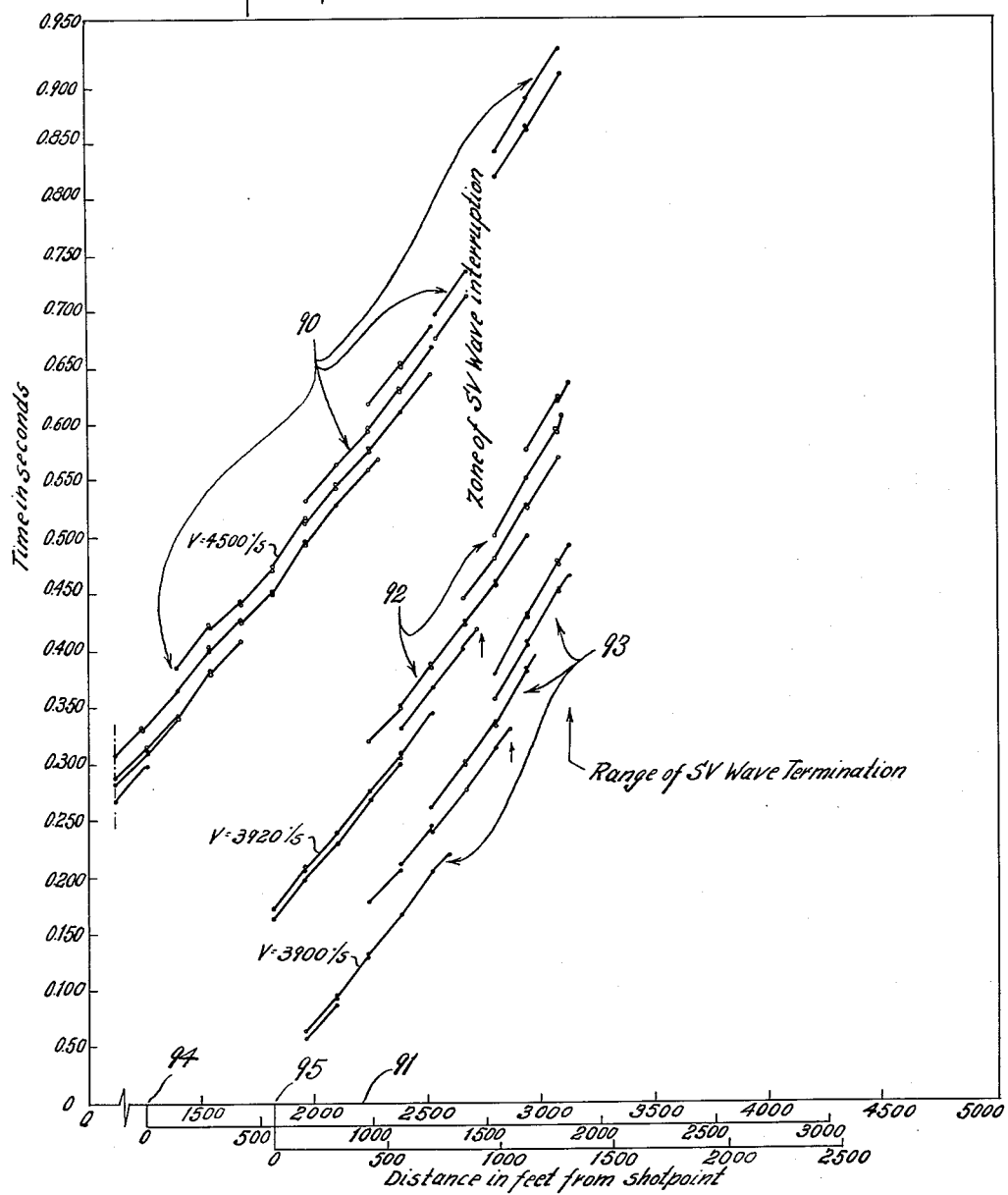

United States Patent Office 3,003,577
Patented Oct. 10, 1961

3,003,577
APPARATUS FOR SEISMIC EXPLORATION
Oswald A. Itria, Bellaire, Tex., assignor to Texaco Inc., a corporation of Delaware
Filed June 5, 1957, Ser. No. 663,830
2 Claims. (Cl. 181—.5)

This invention is generally concerned with seismic exploration. More specifically, the invention deals with, and employs, propagation of seismic travelling waves of different kinds. Among the known travelling waves which fall within the purview of this invention are: one surface wave and three longitudinal, or body, waves which are respectively a Rayleigh wave, longitudinal or P-wave, a horizontally polarized shear wave, and a vertically polarized shear wave. Thus, this invention makes use of one or more of these four different seismic travelling waves.

Different types of seismic waves, including the above-mentioned four, have been recognized as being in existence for some time. But, no one has successfully made use of these waves together, or even separately if exception is taken to the common longitudinal, or P-wave. There have been some attempts in the prior art which were concerned with some of these waves, but much of this concern was in the direction of attempting to eliminate the effects of these waves on a seismic record. There have been at least a few attempts to make use of some of the uncommon types directly, e.g., the shear waves. However, these attempts have been extremely inconclusive and vague as to the results accomplished. In addition, it does not appear that prior attempts to generate polarized shear waves have been successful. Furthermore, the common P-waves will pass around many near surface anomalies without revealing their presence.

Consequently, it is an object of this invention to provide for a method of generating and detecting a plurality of different seismic traveling waves, and making use of the detected waves in such a way as to be able to accurately determine the location or presence of relatively near surface anomalies. Another object of the invention is to teach a method of seismic exploration which employs transverse body waves, and makes use of a particular manner of correlating the detection of such waves so as to be able to follow the passage of such waves along a given line over the surface of the earth.

Briefly, the invention concerns a method of seismic exploration for locating near surface anomalies. This method comprises the steps of generating a plurality of different characteristic seismic travelling waves at a location in the vicinity of the ground-air contact at a given location on the earth's surface. It also comprises the step of detecting the arrival of seismic waves along three mutually perpendicular axes, at a plurality of locations near the surface of the earth spaced from said generating location, said detecting locations being predetermined relative to one another and to said seismic wave generating location. The method also comprises the step of correlating the waves detected along at least one of said axes, among said detecting locations, in order to observe an interruption or change of character in said waves so that the location of a near surface anomaly may be accurately determined.

The invention is described below in considerable detail and illustrated in the drawings, in which:

FIG. 1 is a schematic plan layout of seismic detectors in relation to a shot point showing the detectors connected to a recorder.

FIG. 2 is an enlarged detail schematic, illustrating the placing of three detectors with their sensitive axes at right angles to one another, all three detectors being placed at each individual detector location illustrated in FIG. 1;

FIG. 3 is a sample record illustrating four different types of seismic waves, showing how they may be recognized by introducing the signals from a given one of the three detectors at each location to adjacent ones of a group of adjacent traces of the record;

FIG. 4 is a sample record showing a termination in vertically polarized wave arrivals;

FIG. 5 is a sample profile diagram illustrating the near surface conditions along a given line over the surface of the earth, where a method according to this invention has been carried out; and FIG. 6 is a graph showing a plot of time against distance and indicating the location of termination or change of character in the receipt of vertically polarized shear waves as taken along the profile illustrated in FIG. 5.

Referring to FIG. 1, it is pointed out that in general the steps involved in this invention are similar to, or include, the usual procedures involved in carrying out a seismic refraction profile. However, the differences and distinctions involved in this invention, will become clear as this description proceeds.

In FIG. 1, there is shown a shot point 11 where a hole is drilled from the surface of the earth to a desired depth. In usual seismic exploration work, this hole depth is carried down far enough to penetrate through the weathered layer. As will appear more fully below, it will be beneficial for carrying out this invention to best advantage, to drill the shot point hole somewhat below the bottom of the weathered layer in order to be able to detonate a charge adjacent to the weathered layer interface.

From the shot point 11, a given direction is chosen for investigating the sub-surface conditions, and a plurality of detector locations 12 through 19 are measured from the shot point 11 so that the distances are accurately determined. Each of the detector locations 12 through 19 has a plurality of instruments located thereat and connected to a recorder 20 by any feasible electrical cables, or the like, as indicated by the illustrated circuit connections.

Referring to FIG. 2, there is illustrated in greater detail one group of the instruments that are located at each detector location 12–19. At each such location there is situated three separate detector or detector elements 24, 25 and 26. Each of these detector elements has a separate circuit connection therefor, e.g., connectors 30, 31 and 32 respectively. Thus, the individual circuit connections (shown in FIG. 1) leading from each detector location 12–19 to the recorder 20, is actually made up of three separate electrical circuit connectors, like connectors 30, 31 and 32 illustrated in FIG. 2. The electrical circuits employed, as well as the type of detector used, may take any feasible form. It is contemplated that a number of different well known types of equipment might be employed. Thus, the details of the recording circuits and equipment, form no part of this invention per se.

FIG. 3 illustrates a complete set of records taken simultaneously from a group of detector locations such as locations 12 through 19, illustrated in FIG. 1. It will be noted that there is a group I that comprises eight adjacent traces 35 through 42 at the top of the record. These traces are those made by an oscillograph of the multiple trace type employed in seismic exploration, and each of these traces are made by the signals that are created by the vertical detector 25 of each of the detector groups 12 through 19 (in inverse order). That is, trace 42 is recording the signals created by vertical detector 25 in detector group 12, while trace 41 is the recorded data showing the signals created by vertical detector 25 in detector group 13, etc. Thus, as indicated by the captions, longitudinal or P-waves are the first energy arrivals on each of these traces. Then later in time on the same group of traces 35–42, the arrival of a Rayleigh wave may be observed as indicated in FIG. 3. It is pointed out that it would not be possible to recognize the Rayleigh wave in the absence of recording the signals from the corresponding detectors 25 on adjacent traces, e.g. traces 35–42, of a multiple trace oscillographic record.

In a similar manner, each of the detector elements 24 in detector groups 12 through 19, are connected to the recorder and to separate channels for being recorded on individual traces of a separate group of record traces. This separate group is indicated as group II in FIG. 3. Here again, the individual traces 45 through 52 are connected to the respective horizontally placed detector element 24 in each detector group, 12 through 19 respectively. It is to be noted that these detector elements 24 are placed with their axes in the direction of the shot point location, as taken from each detection group location along the profile. A vertically polarized shear wave is clearly evident, and is indicated by the caption on group II.

Similarly there is a third group of traces 55 through 62 which represent the recorded signals as created by the horizontal transverse detector elements 26 in each of the detector groups 12 through 19. In this case, each detector element 26 is placed horizontally, and with its axis at right angles to the direction toward the shot point. As indicated on the FIG. 3 illustration, a horizontally polarized shear wave arrival may be determined by correlating as a group of adjacent traces 55–62, the signals from each of the detector elements 26. Such a shear wave signal is indicated by reference number 64. Additional traces 65 illustrated below group III, are merely employed to provide an indication of the time of generation of the various seismic waves that correspond with the detonation of the charge of explosive.

Still referring to FIG. 3, it will be noted that there are four different seismic waves that may be separately recognized from a single charge fired at the shot point 11. Two of these are found on the group I traces which are all connected to the detector elements 25 that have their axes placed vertically. The ordinary longitudinal P-wave is recognizable as the first arrival at the detector locations 12–19 and the properties of this wave are already well known and much used. The other wave that may be recognized on the group I traces is the Rayleigh wave and it is to be noted that its velocity of propagation is much less than the P-waves, and even less than the horizontally polarized shear wave as will appear hereafter. This Rayleigh wave is purely a surface wave in nature.

By connecting the detector element 24 of each detector group 12 through 19 to a separate trace on the record, the group II set of traces will result. In this case, it has been found that a vertically polarized shear wave may be recognized by thus correlating the signals from detectors that are lying with their axes horizontal and directly parallel to the line of direction extending from the shot point. This wave is known to have a velocity less than the P-wave and consequently it is to be noted that the location along the record is somewhat delayed following receipt of the first energies to reach the detectors. It is pointed out that although this wave is called a vertically polarized shear wave, it does not substantially effect the detector elements 25 which are located at each detection location. The explanation for this is partially the fact that this wave is a shear wave in nature and so adjacent particles are travelling back and forth in parallel planes at right angles to the direction of travel of the wave. Furthermore this wave travels in a refraction path along the unweathered layer and then reaches the detector locations by coming up from beneath through the weathered layer. This means that the shear wave motion which was vertically up and down transverse to the longitudinal P-wave as it travelled horizontally, is turned to become a backward and forward movement as the wave bends and approaches the surface in a more or less upward, or vertical, direction.

Similarly, a fourth type of seismic wave, which is known as a horizontally polarized shear wave, may be recognized on the record made from signals obtained at the horizontal transversely positioned detectors elements 26. As indicated above, a horizontally polarized shear wave arrival may be recognized on the group III traces at reference number 64, by reason of the correlation obtained by grouping the signals on adjacent traces. One reason this wave may be definitely identified is that such a wave is unique in being the only one of the four waves being considered herein that is detected by the detector elements 26 lying transverse to the direction of the shot point location.

The procedure followed in making a profile determination is in some respects similar to that which is well known in refraction seismic exploration. Thus, in order to investigate the seismic data along a given path, or line, over the surface of the earth, a hot point hole 11 is drilled and then a plurality of detector locations, e.g., 12–19, are measured from this shot point 11 so that the particular distances involved are accurately determined. Then a spread is made so that a group of detectors is placed at each detector location 12–19. After connecting the detectors in each group to the recorder 20, a charge of explosive is fired in the hole at shot point 11 and a record is made of the signals received at each detector in each group location. To continue a profile along the given line of direction from shot point 11, the usual practice involves a pivoting about the most distant detector location, i.e., 19, so that the next spread of detector locations will begin at the same location as the most distant one of the previous spread. To thus pivot, involves leaving the three detector elements 24, 25 and 26 as they were planted at location 19, and connecting them as the closest location of detectors in the next spread of detector locations. This renders a correlation of the records made for each of the spreads quite reliable, because the close trace of one spread is the identical location as was the farthest trace detector location on the previous spread. Consequently, the time of arrival of any signals on the traces of each of the adjoining spreads may be exactly matched.

In FIG. 4, there is an illustration of the correlation of information for a particular one of the detector in the detector groups, from one spread to the next. Thus, there is illustrated a group of traces 70 which were created by the record taken when detector groups, such as groups 12 through 19 of FIG. 1, were located at the distances from the shot point 11, as indicated in FIG. 4, i.e., eleven hundred and twenty feet to twelve hundred and sixty feet. In this instance, the spacing between each individual detector group is twenty feet. Shown at the upper portion of the FIG. 4 example, is another group of traces 71 which are those of a record taken from the succeeding spread, as detector groups 12–19 were pivoted about the group 19 position so that the signals received were of the data at distances of twelve hundred and sixty feet to fourteen hundred feet, again at 20 foot intervals. These traces 70 and 71 are made from detector elements 24 at each of the detector groups. Consequently the waves observed are vertically polarized shear waves. It will be observed also that the following of a vertically polarized shear wave may be continued from one spread to the next and the termination or any sudden change in characteristic of the wave may be readily observed.

For example, there is a vertically polarized shear wave currently present on the group of traces 70 which wave presence is indicated by the caption on FIG. 4. The signal representing this wave on the twelve hundred and sixty foot trace has a reference number 72 applied thereto. Then on the next group of traces 71, this same wave may be observed to continue on the lower three traces of group 71 as indicated by reference number 73. It will be observed that this shear wave no longer is received on the upper traces of group 71, and thus a termination of the receipt of this particular vertically polarized shear wave may be definitely located as being between thirteen hundred feet and thirteen hundred and twenty feet from the shot point.

It has been discovered that there is a definite relationship between the depth of firing of the charge for generating the seismic waves, and the type of waves that are generated. This discovery has been investigated to the extent that it may be shown that the maximum generation of horizontally polarized shear waves occurs when a charge is fired at a relatively short distance below the interface between the weathered and unweathered layers. On the other hand, the maximum generation of vertically polarized shear waves occurs when the charge is fired substantially at the interface between the weathered layer and the unweathered layer. It does appear, in addition, that the vertically polarized shear waves are generated to a high degree over a relatively wide range of depths adjacent to the interface between the weathered and unweathered layers. Consequently, a single charge may be placed so as to generate a relatively high percentage of both horizontally polarized shear waves and vertically polarized shear waves. However, if a survey is to be made without attempting to observe the horizontally polarized shear waves, a most efficient charge depth will be that in the near vicinity of the depth of the interface between the weathered layer and the unweathered layer.

A detailed description of the steps involved in carrying out this invention may be set forth as follows: reference being had to FIGS. 1 and 2 in particular.

A first step is that of generating the seismic waves including vertically polarized shear waves, horizontally polarized shear waves, and Rayleigh waves in addition to the expected longitudinal, or P-waves. Such generation of the various types of seismic waves may be carried out by numerous procedures in accordance with known methods. However, it is preferred to employ the detonation of an explosive charge in a hole drilled at a given location and extending at least a short distance into the unweathered layer which lies beneath the surface sedimentary materials. Furthermore, in accordance with the preferred steps of this invention, such explosive charge should be detonated adjacent to the interface between the weathered layer and the unweathered layer. In addition, if the data required is only concerned with horizontally polarized shear waves, the charge detonated should be located at a depth which lies adjacent to, but preferably below, the interface between the weathered and unweathered layers.

A second step of the method according to this invention is that of detecting the seismic waves as they reach predetermined locations at or near the surface of the earth, and spaced from the location of the shot point where the charge is detonated. This detection is carried out by placing one or more detectors that are sensitive to seismic energy only along the axes thereof. Such detector or detectors will be placed with their axes located mutually perpendicular to one another and located in one of three positions depending upon which type of seismic wave is to be detected. Thus, in the ordinary case a group of three detector elements, e.g., detector elements 24, 25 and 26 of FIG. 2, will be placed at each detector location so that all three components of seismic energy received at this location may be detected.

Another step in the method involves the correlation of data, as detected at the above indicated plurality of detector locations. In order to be able to correlate the data thus received, it is necessary to apply the signals as separately received from each detector in each group location with the correspondingly placed detectors in all the other detector group locations. This correlation is carried out by introducing such data to any feasible means for observing the data as related from one to the next of these detector group locations. The way this is carried out in the illustrated showings herein, is to apply such data to individual adjacent traces of an oscillograph. The usual type of oscillograph employed in seismic exploration is one where each trace is impressed on a film strip as a transversely oscillating spot of light which is oscillated by the rotation of a mirror controlled directly by the movements of a galvanometer coil. In order to thus correlate the information, adjacent traces must be employed for the corresponding detector in adjacent detector groups. In this manner, a wave which has a common source may be recognized by the alignment of such wave as it is received on the various detectors. In the absence of such correlation with adjacent waves, the particular wave could not be recognized with any degree of certainty.

It may be noted that the record or records could be first made on a reproduceable medium, such as a magnetic tape. However, if this is the case, it still would be necessary to make separate records of the data as created by the individual detectors at each detector group location. Then when the data as contained on the magnetic tape is taken off for recording or observation, the signals from adjacent detector stations must be applied to adjacent oscillograph traces, in order to render the recognition of a given wave feasible.

Referring to FIGS. 5 and 6, an illustration is had of the way in which a near surface anomaly may be accurately located by means of a seismic survey in accordance with this invention. The cross-section view illustrated in FIG. 5 is one that was determined by carrying out a series of velocity logging operations in holes drilled along the section illustrated. Thus, it was determined that over the given traverse, the weathered layer consisted of a portion 80 having a given velocity that is normal or average for a weather layer. Then as this section was continued from left to right as viewed in FIG. 5, the weathered layer 80 became narrower and shifted to a weathered layer 81 having considerably lower velocity material therein. Next, there was found a definite anomaly in the form of a pocket, or relatively isolated, low velocity portion 82 in the weathered layer. Also, at the same time there was found to exist an intermediate layer of relatively lower velocity unweathered material 83. In addition, lying underneath all of the upper near surface materials, there was determined to be a usual unweathered layer 84 having a normal high velocity of seismic wave propagation.

Referring to FIG. 6, it will be observed that a graph has been plotted with time in seconds as the ordinate and distance from the shot point in feet as the abscissa. There are three separate plots of vertical shear waves from three different shot points. Thus, there is an upper group of plots 90 which are a representation of vertically polarized shear wave arrivals taken from records made with the detectors placed at the distances as indicated on an upper scale 91 along the abscissa of the graph. It will be noted that the scale along the ordinate of the graph is calibrated in time, as decimal fractions of a second. In addition, it is to be noted that the abscissa of the graph of FIG. 6 is located directly under the showing of the cross-section along the traverse of FIG. 5. Furthermore, the scale of distance in feet is the same in the FIG. 5 cross section and in the abscissa scales in the FIG. 6 graph. Consequently the information taken from the plots 90 may be directly compared with the known conditions that are illustrated in the FIG. 5 cross-section.

There are also shown separate plots 92 and 93 which have been made from records taken on separate seismic traverses as carried out from two separate shot points located at zero scale points 94 and 95 respectively. These two separate shot points are located along the same traverse along which the cross-section of FIG. 5 is taken, as indicated above. The locations of these separate shot points relative to the first shot point, is represented by the locations of the zero points 94 and 95 to the zero on the abscissa of the main graph.

It is pointed out that the plots 90, 92 and 93 are in the form of lines connecting pairs of points. The points are the picks of the vertical shear wave arrivals on the first and last trace for a given spread, and the lines indicate a vertical shear wave across the adjacent traces of a record. These adjacent traces are made from the data as picked up by the horizontal detector in each group that is lying with its axis pointed along the traverse.

It will be observed on the graph of FIG. 6 that an interruption may be noted in the receipt of SV (vertically polarized shear) waves from the shot point that was employed in obtaining the data for the plots 90. This interruption is located at about twenty-seven hundred feet from the shot point. It is at this location that a sub-surface anomaly exists in the form of a narrowing of the weathered layer accompanied by the appearance of the relatively lower velocity unweathered layer 83. Furthermore and more obvious is the fact that a complete and definite termination of the SV waves may be observed at a point about thirty-one hundred feet from the shot point. In addition the plots of SV waves as received from all three of the shot points and shown in plots 90, 92 and 93 shows clearly a termination at the same point. This termination point coincides with a definite sub-surface anomaly which may be seen in the FIG. 5 cross-section as the isolated very low velocity portion 82, which is most likely a buried river bed or the like.

Thus by carrying out a survey in accordance with this invention, there is a clear indication of the location of an anomaly where the various vertically polarized shear waves all terminate. This anomaly may be confirmed by relating the distance of its occurrence on the graph shown in FIG. 6, to the corresponding distance along the cross-section showing of FIG. 5. It will be observed that the definitely much lower velocity pocket 82 of weathered material is in the nature of an anomaly which has been located by means of the method in accordance with this invention.

While the illustrated example of determining the location of an anomaly in FIGS. 5 and 6, employed the use of vertically polarized shear waves only, this was merely illustrative of one manner of carrying out this invention. Thus, the same manner of correlating and relating the various data of a seismic survey in accordance with this invention may be carried out with the plotting and observing of the interruptions or changes in character of other types of seismic waves, such as a horizontally polarized shear wave for example. It is contemplated that in most instances, the carrying out of the invention would be done employing the entire group of three detectors at each detector station during a complete traverse from any given shot point. Consequently, the data obtained could be evaluated so as to follow the actions of as many different types of seismic waves as possible. The information thus gained could then be studied as a whole.

The exact behavior of the various waves involved in carrying out a method according to this invention, is not known. However, certain theories of the operation appear to be borne out by the results as at present known. Thus, it would seem that the horizontally polarized shear waves are favorably generated in the vicinity of an interface between different velocity layers and are more favorably propagated within some overlying stratum, and that they may remain therein exclusively as they travel outward from the shot point. Furthermore, the results of terminations and changes in character of these horizontally polarized shear waves seem to bear out this theory, and point to the fact that major changes in the thickness of the weathered layer, cause corresponding changes in the impedance presented to the passage of these waves. Thus, an analogy with wave guide action, seems valid.

In the case of the vertically polarized shear waves, it is a present theory that they are propagated largely along near the surface of the unweathered layer by travelling within this unweathered layer. However, they seem to be effected by anomalous discontinuities in the near surface materials of both the weathered and unweathered layers.

Irrespective of the theories as to how the various waves are propagated and what causes their different characteristics, it has been discovered that by making a refraction type of survey in accordance with this invention, near surface anomalies that would be unrecognizable from any surface conditions, may be readily discovered and the location thereof determined to a close degree. It is contemplated that by following all of the types of waves that may be picked up while employing a method according to this invention, any interruption or discontinuity of one of the waves may well provide the desired indication of some type of sub-surface anomaly. In this way, it will be appreciated that the exact location of sub-surface phenomena such as old river beds, or large boulders, or various other changes in the sub-surface conditions, may be exactly located from the surface.

While certain embodiments of the invention have been described above in considerable detail in accordance with the applicable statutes, this is not to be taken as limiting the invention in any way but merely as being descriptive thereof.

It is claimed:

1. A seismic exploration device comprising a source of seismic disturbance, a plurality of detectors laterally spaced from said source, and a recorder connected to said detectors, each detector comprising at least three detector elements, each having an axis of maximum sensitivity and each of said axes being mutually perpendicular to the others, and said recorder having means recording in trace groups the seismic energy received by each group of like detectors.

2. The invention according to claim 1 wherein said source of seismic disturbance is located vertically closely adjacent to the interface between the weathered layer and the unweathered layer of the earth.

References Cited in the file of this patent

UNITED STATES PATENTS

| | | |
|---|---|---|
| 2,229,191 | Schaeffer et al. | Jan. 21, 1941 |
| 2,340,770 | Reichert | Feb. 1, 1944 |
| 2,354,548 | Ricker | July 25, 1944 |
| 2,390,187 | Sharpe | Dec. 4, 1945 |
| 2,596,463 | Barthelmes | May 13, 1952 |
| 2,658,578 | Oliphant | Nov. 10, 1953 |
| 2,710,070 | Merten | June 7, 1955 |
| 2,880,816 | Widess et al. | Apr. 7, 1959 |

OTHER REFERENCES

Jakosky, "Exploration Geophysics," second edition, published by Trija Publishing Co., Los Angeles, Calif., 1950, pages 640–641, 666–669 relied on.